June 30, 1970 K. O. JOHNSON 3,518,442

VIDEO PLAYBACK ASSEMBLY WHEREIN THE RECORD DISC
HAS OPTICAL RECORDINGS ON BOTH SIDES

Filed June 6, 1968 2 Sheets-Sheet 1

INVENTOR:
Keith O. Johnson
Jessup and Beecher
By Keith D. Beecher
ATTORNEYS

INVENTOR:
Keith O. Johnson
Dressup and Beecher
By Keith D. Beecher
ATTORNEYS

United States Patent Office 3,518,442
Patented June 30, 1970

3,518,442

VIDEO PLAYBACK ASSEMBLY WHEREIN THE RECORD DISC HAS OPTICAL RECORDINGS ON BOTH SIDES

Keith O. Johnson, Topanga Canyon, Calif., assignor to Gauss Electrophysics, Inc., Santa Monica, Calif., a corporation of California Filed June 6, 1968, Ser. No. 735,058
Int. Cl. G01n *21/30;* G11b *7/24*
U.S. Cl. 250—219 8 Claims

ABSTRACT OF THE DISCLOSURE

An improved video signal playback assembly is described in the following specification, the assembly being capable of deriving signals which have been optically recorded on one side of a recording medium, and which does not respond to signals which may have been optically recorded on the opposite side of the medium.

The assembly is intended to be used in conjunction with a transparent video disc record which has separate optical video recordings on each side thereof. The assembly provides for the creation of a light source within the video disc record, this being achieved, for example, by providing a diffusion layer inside the disc. The light is directed from the source through the near side of the disc as a wide cone, so that the video recordings on that side are effectively "summed" and do not modulate the light to any appreciable extent. The light is focussed into the diffusion layer within the disc, so that a bright secondary light source is created in that layer. The light from the secondary light source is directed through the video recordings on the other side of the disc, and optical means is provided adjacent the other side for creating light signals coresponding to the video recordings on that side of the disc in response to the light from the secondary source.

RELATED COPENDING APPLICATIONS

Ser. No. 507,474—filed Nov. 12, 1965 now Pat. No. 3,423,698; and Ser. No. 627,701—filed Apr. 3, 1967 now Pat. No. 3,430,966.

BACKGROUND OF THE INVENTION

A video disc record is described in copending application Ser. No. 627,701, in which video signals are optically recorded on one or both sides of a transparent plastic disc. The information recorded on the video record disc may be reproduced, for example, by the servo controlled playback system described and claimed in copending application Ser. No. 507,474.

As described in the application Ser. No. 507,474, the transparent record disc is rotated on an appropriate turntable, and light is directed from a light source through the disc. A photoelectric transducer is mounted on the other side of the disc in alignment with the light source. Both the light source and the photoelectric transducer are moved as a unit from the periphery of the disc towards its center, as the disc is rotated. In this manner, the photoelectric transducer and the light source are caused to follow a spiral recording track on the disc. A servo system is provided in conjunction with the playback assembly which serves to maintain the photoelectric transducer in proper registry with the spiral recording track of the disc during the playback process.

Copending application Ser. No. 627,701 describes a transparent video record disc which is particularly adapted for use in the playback assembly of the application Ser. No. 507,474. One of the disc embodiments described in the copending application Ser. No. 627,701 is a transparent video record disc having recordings on both sides so as to permit two-sided playing of the disc. The record disc described in the copending application includes a central layer of light diffusing material. The light diffusing material, for example, may be a transparent plastic material, or a beaded lenticularly surfaced material, or other suitable light diffusing or other light responsive material, may be used.

The playback system of the present invention is constructed to respond to the recordings on one side only of the aforesaid two-sided video record disc, so that either side may be played as in a usual sound reproducer phonograph.

SUMMARY OF THE INVENTION

The playback system of the invention serves to focus a light beam from one side of the video disc record into the plane of the central diffusing layer of the disc so as to provide a brilliantly illuminated area in that layer. This area functions as a secondary light source within the disc record itself, and light from the secondary source is directed through the recordings on the opposite side of the record to be modulated thereby. The resulting light signals are detected and transformer into equivalent video signals.

It will be appreciated that the light enters the video disc record from the external light source as a relatively large diameter cone, so that the recordings on the near side of the record have no material effect in modulating the light. However, the light leaving the disc from the internal secondary light source may have a relatively small diameter at the opposite side of the disc so as to be effectively modulated by the recordings on that side.

DESCRIPTION OF THE ILLUSTRATED EMBODIMENT

As mentioned above, the present invention is concerned with a photoelectric playback assembly which makes it feasible to provide video record discs with separate recordings on each side. The concept of the invention, as explained above, is to create a secondary light source within the disc itself. As will be described in more detail subsequently, this may be achieved, for example, by providing a translucent or "diffusion" layer inside the disc. The light is directed through one side of the disc as a wide cone, so that recordings on that side have no appreciable effect on the light. The light is focused into the diffusion layer, as mentioned above, so that a bright source is created in the plane of that layer. This source is then used to create light signals which are modulated in accordance with the recordings on the other side of the disc. The incoming light from the first source could be focused on the underside of the far side of the video record disc, so as to obviate the necessity for the internal translucent layer, if so desired.

Briefly, therefore, in order to prevent the modulation of the light from the first source from the information recorded on the near of the video disc record, a first optical lens system is provided which produces a cone of light rays converging on the internal light diffusion layer, and passing with relatively large diameter to the near side of the disc. Therefore, many bits of the recorded video information are encompassed by the light rays on the near side, so that none of the bits is resolved. In this manner, the light intensity reaching the light diffusion layer is diminished only by an average amount equal to the area of the cone as it passes through the near side.

As explained in the copending application Ser. No. 627,701, the internal layer may consist of translucent china fill or equivalent light diffusing layer. As an alternative, the light diffusing layer may comprise a beaded lenticularly surfaced plastic of a different diffraction index than the materials making up the disc itself. Other equivalent construction may be used to form the translucent light responsive layer in the disc record, as also explained in the copending application 627,701.

Figures 1, 2, 3:
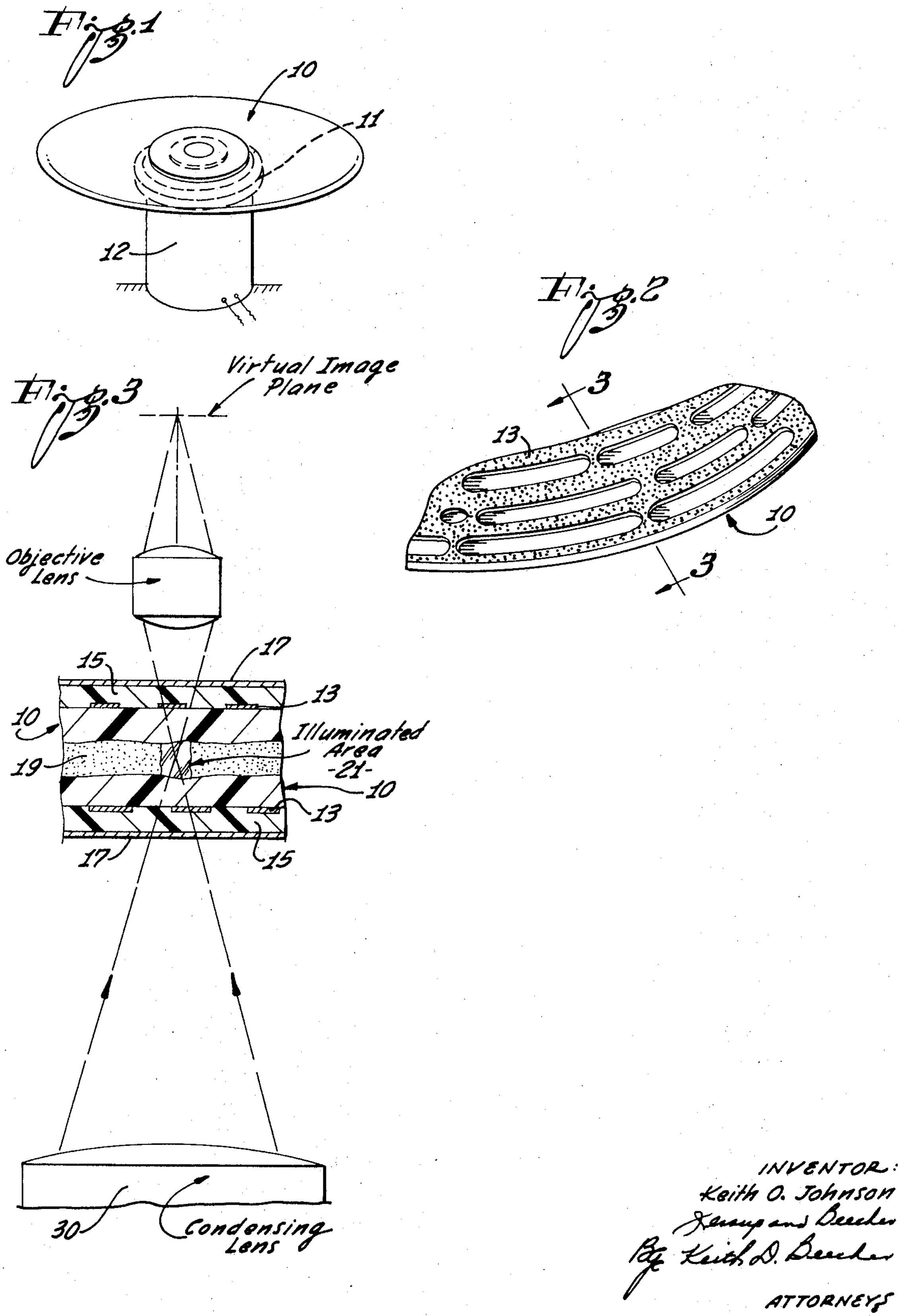
FIG. 1 is a perspective view of a transparent video record disc having, for example, separate optical video recordings on both sides thereof, the disc being mounted on a suitable turntable for playback purposes.
FIG. 2 is a fragmentary representation of the disc shown in FIG. 1 on a somewhat enlarged scale.
FIG. 3 is an enlarged representation of a section of the disc of FIG. 2 taken along the line 3—3 of FIG. 2, and also schematically representing various optical lens systems, and illustrating the manner in which light is introduced into the disc to create the desired light signals.

As illustrated in FIG. 1, a transparent disc record 10, which is constructed in a manner described in detail in the copending application Ser. No. 627,701, is rotatably driven by a turntable 11 which, in turn, is driven by a motor 12. As more clearly shown in FIG. 2, a metallic deposit 13 is formed on the record disc 10. The metallic deposit interrupts the transparency of the disc in a particular pattern, so that a spiral optical recording track is formed on the disc. The recording track extends from the periphery of the record disc towards its center, and the video signals are recorded in the spiral track in an optical manner.

When the record disc 10 on the turntable 11 is rotated by the motor 12, and as will be described in more detail in conjunction with FIGS. 4 and 5, a light source is moved under the disc from its periphery towards its center in axial alignment with a transducer head which is moved over the disc. The relationship between the light source and the transducer head is such that the light from the light source passes through the optical recordings on the spiral track to be modulated thereby. The transducer head responds to the resulting light signals to convert the same into corresponding electrical video signals.

To permit playing of both sides of the disc, and as shown in FIG. 3, the metallic deposit 13 is disposed on both sides of the disc, to constitute separate recordings on each side. It is preferable for the metallic deposit to be disposed down below the surface of the disc, so that the recordings may be protected under normal rough usage of the disc. For example, a layer of transparent plastic 15, the same index of refraction of the material of the disc 10, may be caused to flow over the surface of both sides of the disc, so as to cover the metal deposit 13 and to fill the transparent grooves and depressions in the surface of the disc.

The layer 13 forms a protection for the metallic deposit, so that it cannot become corroded, or damaged by handling, or the like. A further thin transparent layer 17 of an electrically conductive material, such as transparent carbon, for example, may be deposited over both sides of the disc. This latter layer serves to inhibit any electrostatic charges from forming on the disc, and which have a tendency to attract dust and other particles.

As mentioned above, the disc 10 includes an internal light diffusing layer 19. As mentioned in the aforesaid copending application 627,701, and as stated previously herein, this layer may consist of translucent plastic material, or it may have any other suitable construction to respond to incident light so as to produce a secondary source.

In order to prevent the modulation of the light rays from the primary source by the recordings on the near side of the disc, a condenser lens 30 is provided, as shown, for example, in FIG. 3. This condenser lens produces a cone of light rays which pass through the near side of the disc, and which converge in the layer 19 to form illuminated area designated 21 in FIG. 3. The cone of light passing through the near side of the disc has sufficient diameter, so that many bits of the video recordings are encompassed by the light, and none is resolved. Therefore, the light intensity reaching the layer 19 is diminished only by an average amount, and is not modulated to any material extent.

The secondary light source formed by the illuminated area 21 produces light through the recordings on the opposite side of the disc, and this latter light is focused by an objective lens system 32 into a virtual image plane designated 33. A light sensitive member of a photoelectric transducer, as will be described in conjunction with FIGS. 4 and 5, extends into the plane 33, so that the resulting light signals, corresponding to the video recordings on the far side of the disc 10, are sensed thereby. Therefore, by either turning the disc 10 or the playback assembly itself, each side of the disc 10 may be played in the system to be described.

Figure 4:
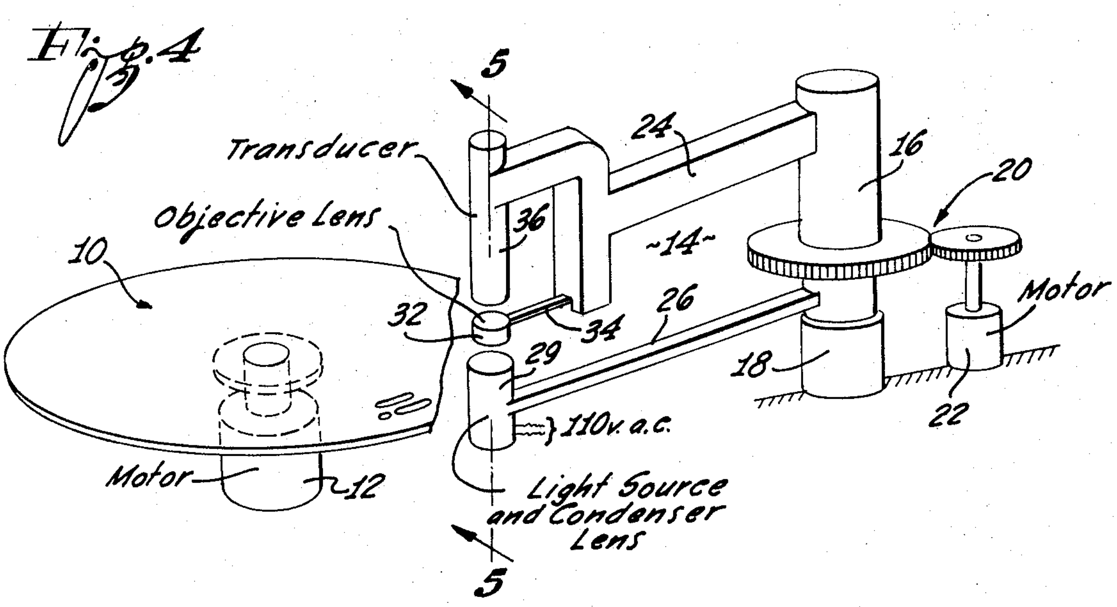
FIG. 4 is a somewhat schematic representation of a playback assembly which is suitable for deriving the signals recorded on the video record disc.
Figure 5:
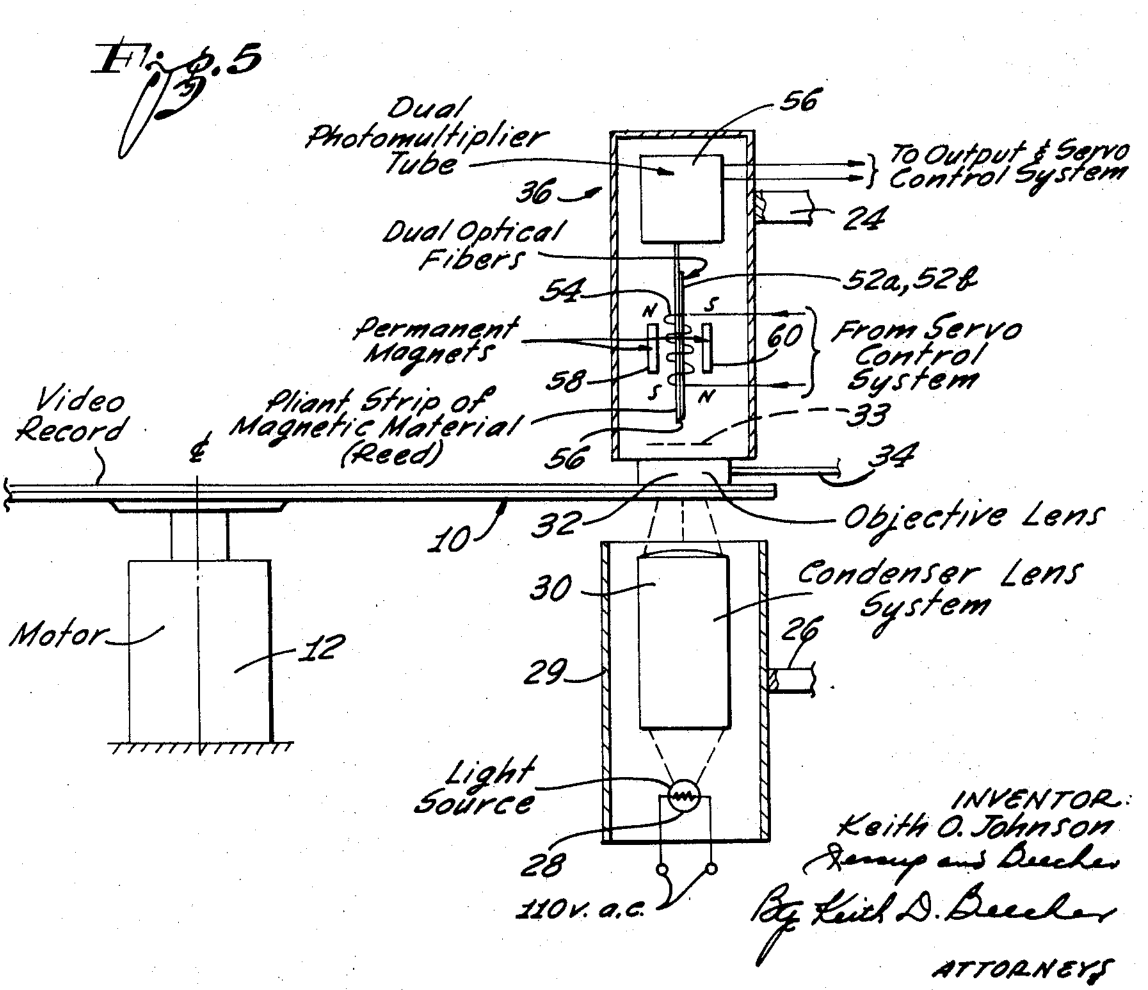
FIG. 5 is a section of the assembly of FIG. 4, taken along the line 5—5 of FIG. 4.

The apparatus shown in FIGS. 4 and 5 includes the video record disc 10 and the motor 12. The motor may rotate the disc, for example, at speeds in the range of 900–3600 r.p.m. A playback assembly 14 is included in the apparatus, and the assembly is positioned such that its light-sensitive elements can travel along the spiral recording track on the disc 10. The playback assembly includes, for example, a post 16 which is rotatably mounted in a fixed tubular base 18. The post 16 may be rotatably driven around its longitudinal axis by an appropriate gear and pinion combination 20, or other suitable drive means, driven, for example, by a rotor 22. A pair of spaced parallel upper and lower radial arms 24 and 26 extend out from the post 16. These arms are positioned such that the radial arm 24 passes over the plane of the rotating video disc record 10, and the radial arm 26 passes under the plane of the rotating disc.

A light source in the form, for example, of a mercury vapor lamp 28 (FIG. 5) is supported at the end of the arm 26 in a suitable tubular housing 29. The condenser lens system 30 referred to above in conjunction with FIG. 3 is also positioned in the housing 29. As mentioned above, the condenser lens system serves to focus the light from the source 28 into the layer 19 (FIG. 3) in the video disc record.

As the motor 12 rotates the video disc record, a modulated light signal appears at the upper side of the disc, representing the video intelligence recorded on that side of the disc, as mentioned above. The objective lens 32 is supported on the ends of a flexible coupling 34 which, in turn, is affixed to the end of the arm 24. The coupling 34 may be in the form of a strap, which is flexible in a direction perpendicular to the plane of the record 10, so that the objective lens 32 may move up and down in the aforesaid perpendicular direction. The objective lens 32 rides on a film of air in close proximity with the upper surface of the video recording disc 10, and it moves up and down in response to irregularities in the upper surface of the disc.

A transducer 36 is also supported on the end of the arm 24 in optical alignment with the objective lens 32. The objective lens 32 directs the light signals from the disc 10 to the aforesaid virtual image plane referred to in conjunction with FIG. 3. The transducer 36, as will be described, responds to the light signals to produce output electrical signals corresponding to the video information recorded on the upper side of the disc 10. The transducer also uses the light signals to produce output control signals which are used in a servo system, as described in the copending application 507,474, to maintain the transducer in proper registry with the recording track on the disc.

As shown in FIG. 5, the transducer 36 may include a dual-type photo-multiplier tube 50, or other suitable radiation detector. This photomultiplier tube may be of the type described in U.S. Pat. No. 3,349,273, which issued Oct. 24, 1967, in the name of David Paul Gregg. However, any other suitable dual photodiode, such as the PIN avalanche type multiplication diode may be used. The transducer also includes a pair of optical fiber members **52*a* and 52*b*, or other appropriate radiation guides, which are attached to one another and which are suspended from the photomultiplier tube 50 adjacent one another, on a pliant magnetic reed member 56, and which extend to the virtual image plane 33. The optical fibers 52*a* and 52*b* serve to translate the modulated light signals received from the objective lens 32 to the sensitive elements of the photo-multiplier tube 50**.

As mentioned above, the objectives lens 32 focuses the modulated light signals in the virtual image plane 33 at the lower end of the optical fiber members, and the light signals are then carried by the optical fiber members **52*a* and 52*b* to the photo-multiplier tube 50. The photomultiplier tube acts as a photoelectric transducer, and it produces corresponding electrical video signals in response to the modulated light signals. As described in the aforesaid Pat. 3,349,273, the photo-multiplier tube 50 is a dual type, and it includes two independent portions which respond respectively to the light signals from the optical fibers 52*a* and 52*b*** to produce independent video electrical output signals.

In the practice of the invention, the lower ends of the optical fibers **52*a* and 52*b* are radially movable in unison along an axis essentially traversing the recording track on the disc 10. The optical fibers, as will be described, introduce their light signals to the two independent portions of the photo-multiplier tube 50, and the photomultiplier tube produces electrical control signals which, as mentioned, are independent of one another and which correspond respectively to the light signals received from the optical fibers 52*a* and 52*b***.

The aforesaid electrical control signals from the photomultiplier tube 50 are used in a servo system described in the copending application Ser. No. 507,474. The servo system applies a control signal to a coil 54 in the transducer 36, which effectively controls the radial position of the lower end of the optical fibers **52*a* and 52*b* with respect to the recording track on the disc 10. This control serves to maintain the sensing elements in the transducer 36 in registry with the spiral recording track of the disc 10 as the transducer 36 effectively moves along the track. It will be appreciated, of course, that the motor 22 in FIG. 1 causes the arms 24 and 26 to swing slowly across the disc 10, as the disc 10 rotates, so that the transducer 36 is caused effectively to follow the spiral recording track on the disc. While this tracking is taking place, the servo control system to be described maintains the radial position of the optical fibers 52*a* and 52*b*** in registry with the recording track.

In the system shown in FIG. 5, the optical fibers **52*a* and 52*b* are mounted on a thin pliant magnetic reed member 56, as mentioned above, and which may be of the type presently used in magnetic reed switches. The magnetic reed 56 is suspended from the lower end of the photo-multiplier tube 50 with the optical fibers 52*a* and 52*b* within the coil 54, and a pair of permanent magnets 58 and 60 are positioned on opposite sides of the coil. These magnets are longitudinally magnetized in opposite directions, as shown, so that when currents are passed through the coil 54, the resulting magnetizing effect of the reed 56 causes the optical fibers 52*a* and 52*b*** to be deflected to the right or left in FIG. 3, depending upon the polarity of the servo control current.

It will be appreciated that the optical fibers **52*a* and 52*b* both respond to the modulated light signals passing through the recording track of the disc 10. The outputs of the two sections of the photo-multiplier tube 50 are applied to the aforesaid servo control system. The two optical fibers are disposed in side-by-side relationship, as shown, so that they are positioned in transverse relationship with the spiral recording track on the video recording track disc of FIG. 2. It will also be appreciated that so long as both the optical fibers 52*a* and 52*b* are within the confines of the recording track, the mean signal output from the two photo-multiplier sections of the photo-multiplier tube 50 will be the same. However, whenever there is a tendency for the transducer head 36 to become mis-registered with the optical recording track, so that one of the optical fibers 52*a* or 52*b* moves beyond the edge of the track, the mean signal amplitude from the two sections of the photomultiplier tube 50 will be different. This difference is used in the said servo system to produce an error signal which, in turn, is applied to the coil 54** to bring the optical fibers back into registry with the recording track.

Specifically, the servo control signal is applied through the coil 54, and maknetizes the reed 56. The resulting magnetization of the reed 56 reacts with the permanent magnets 58 and 60 to shift the lower ends of the optical fibers **52*a* and 52*b* in a radial direction with respect to the disc 10. The direction and amount of shift depends upon the polarity and amplitude of the error signal, so that the servo system serves to maintain the lower ends of the optical fiber elements 52*a* and 52*b* in perfect registry with the spiral recording track on the record 10** of FIG. 2.

The invention provides, therefore, an improved video record disc construction whereby separate recordings may be formed on both sides of the disc; and it also provides an improved playback assembly for reproducing the video intelligence on either side of the disc.

While a particular embodiment of the invention has been described, modifications may be made. These are covered in the following claims.

What is claimed is:

1. A transducer head assembly for use in conjunction with a transparent disc-like record having separate optical recordings on each side thereof, said assembly including: photoelectric transducer means including a light-sensitive member extending into a predetermined plane; a light source having a predetermined fixed position relative to said light-sensitive member; first optical means for directing a beam of light from said light source through the optical recordings on one side of said record to form an illuminated area within said record; second optical means responsive to light from said illuminated area within said record for providing light signals in said predetermined plane representative of the optical recordings on the other side of said record; and drive means for producing relative movement between said disc-like record on one hand and said light-sensitive member and light source on the other hand.

2. The assembly defined in claim 1 in which said disc-like record includes an internal light responsive layer, and in which said first optical means forms said illuminated area in said light-responsive layer.

3. The assembly defined in claim 2 in which said light-responsive layer has light diffusion capabilities.

4. The assembly defined in claim 1 in which said first-optical means includes a condenser lens.

5. The assembly defined in claim 1 in which said second optical means includes an objective lens.

6. A disc-like record formed of transparent material; opaque means forming a recording track on one side of said record and interrupting the transparency thereof in correspondence with signals recorded thereon; and opaque means forming a recording track on the other side of said record and interrupting the transparency thereof in correspondence with signals recorded thereon.

7. The disc-like record defined in claim 6 and which includes an internal layer of light diffusing material.

8. The disc-like record defined in claim 7 in which said internal layer is formed of a beaded lenticularly surfaced material of a light diffraction index different from the aforesaid transparent material.

References Cited

UNITED STATES PATENTS

| | | |
|---|---|---|
| 2,136,143 | 11/1938 | Michaelis. |
| 2,950,971 | 8/1960 | Lewin. |
| 3,281,151 | 10/1966 | Kaprelian et al. |

ARCHIE R. BORCHELT, Primary Examiner

C. M. LEEDON, Assistant Examiner

U.S. Cl. X.R.

84—1.18; 179—100.3; 274—41.6